June 10, 1930.  J. C. HOWLAND  1,763,396
CENTRIFUGAL GRAIN DISTRIBUTOR
Original Filed Dec. 30, 1926   2 Sheets-Sheet 1
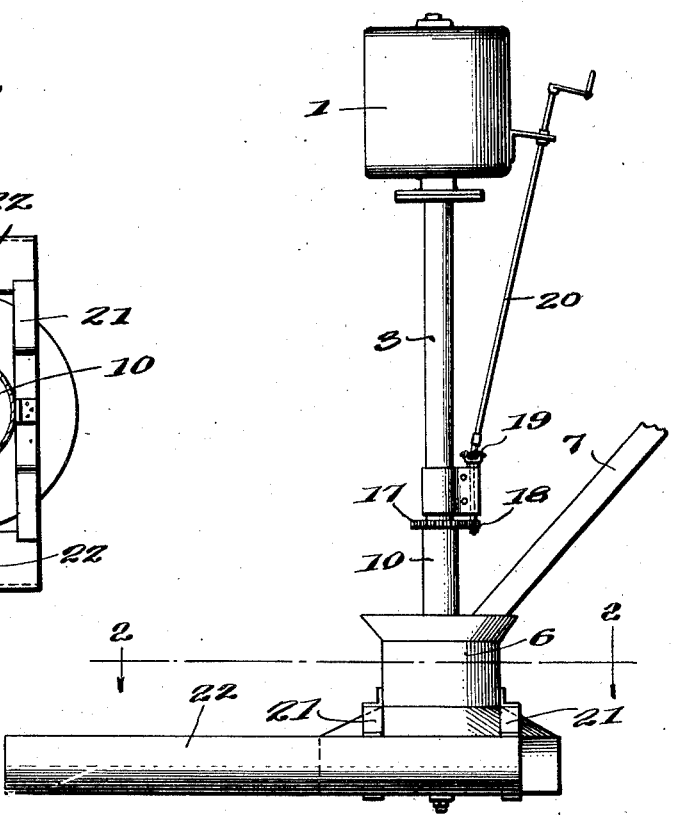
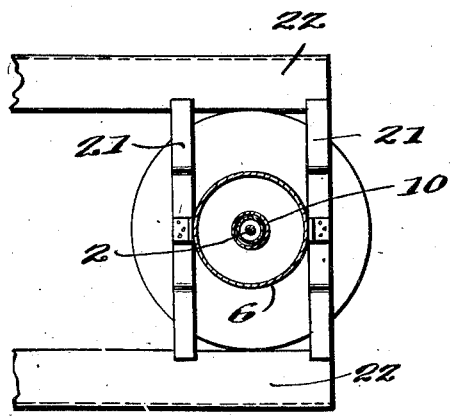
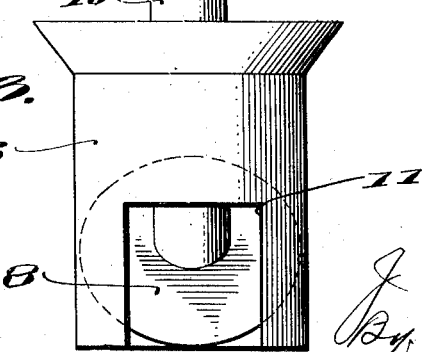
INVENTOR
ATTORNEY

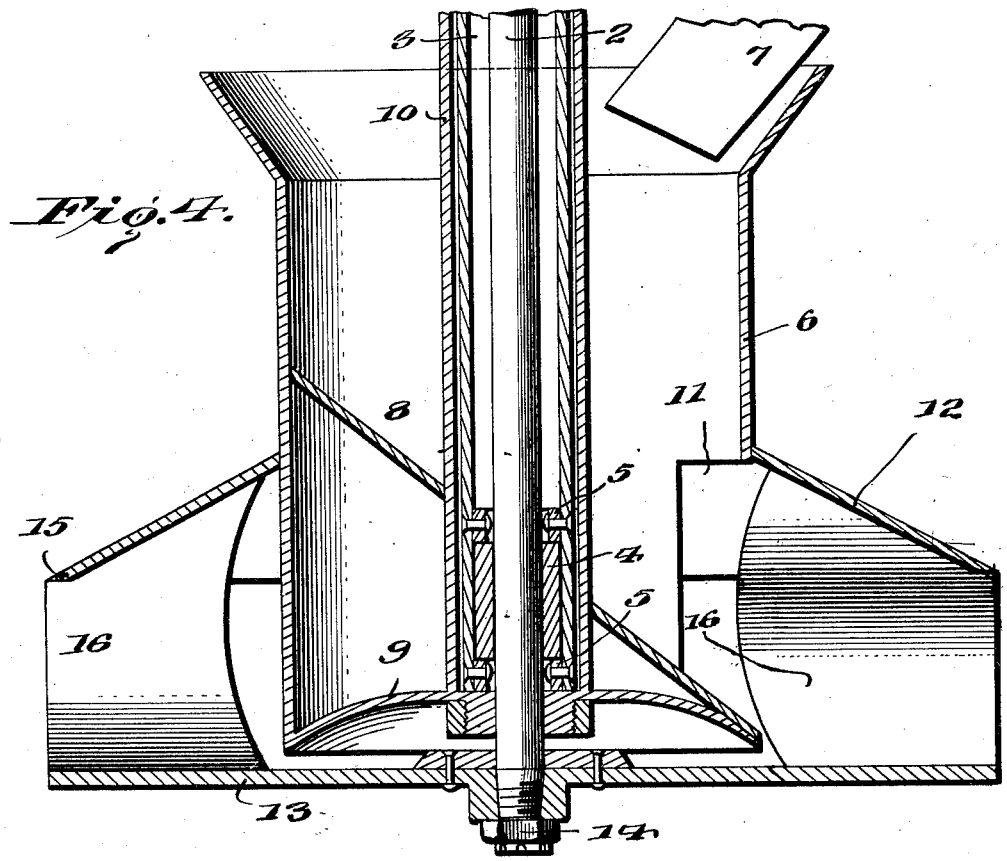
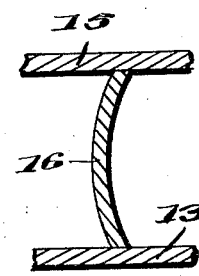
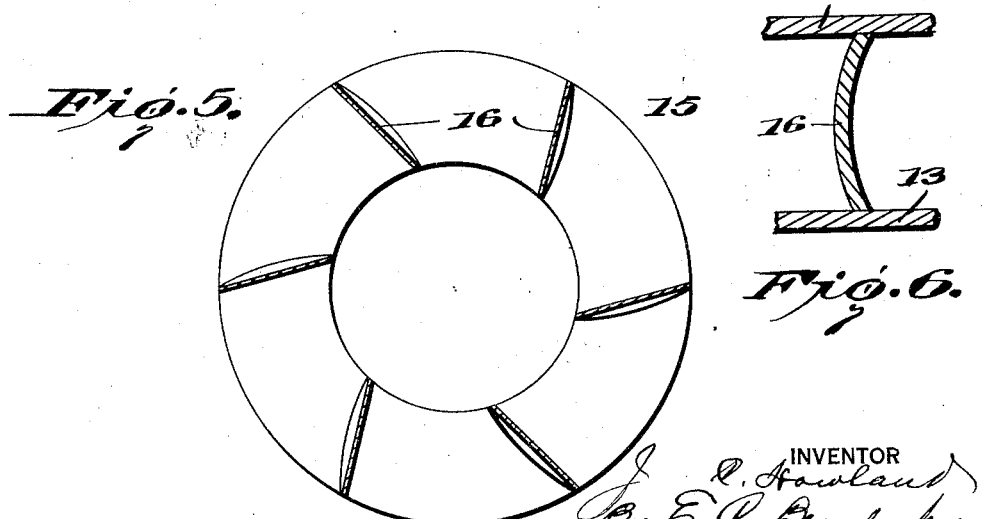

Patented June 10, 1930

1,763,396

UNITED STATES PATENT OFFICE

JUDSON C. HOWLAND, OF GALVESTON, TEXAS

CENTRIFUGAL GRAIN DISTRIBUTOR

Application filed December 30, 1926, Serial No. 158,043. Renewed March 19, 1930.

This invention relates to an improvement in centrifugal grain distributors.

The object of the invention is to direct the grain into and over the hold of a ship to any part thereof. Heretofore, in loading ships from grain-elevators, a long grain pipe leads therefrom into the hold of the ship and it is necessary with such grain pipe for a large number of men to be stationed down in the hold of the ship to shovel the grain about and keep it level, as it pours thereinto from the grain pipe. This method of distributing the grain over the hold of the ship and keeping it level therein is very expensive and dangerous because men frequently become covered with the grain and are often killed in this way.

This invention obviates these objections by providing a mechanical device for this purpose.

The invention is constructed in the form of an adjustable hopper provided with an inclined bottom which receives the grain from the usual grain feed pipe and directs it between the blades which are fixed between the two revolving disks. The disks are mounted on a drive shaft which is driven by a suitable motor, so that as the grain is directed between the disks, the blades carry it around and throw it outward through a peripheral opening in the hopper so that it is distributed over various parts of the ship. The hopper may be seated between suitable guides, if desired, in order to shield the grain and direct it in some particular direction.

In the accompanying drawings:—

Fig. 1 is a side elevation of the invention;

Fig. 2 is a horizontal sectional view on the line 2—2 of Fig. 1;

Fig. 3 is a side elevation of the hopper;

Fig. 4 is a vertical sectional view through the hopper and distributing disks;

Fig. 5 is a horizontal sectional view through the distributing blades showing the upper disk in side elevation; and Fig. 6 is a transverse detail sectional view through one of the distributing blades.

As shown in Fig. 1, the numeral 1 indicates a suitable form of electric or other driving motor, which is connected with the outer end of the drive shaft 2, which extends through its housing 3.

As shown in Fig. 4, the housing 3 is spaced apart from the shaft 2 by means of a bushing 4 and collars 5, which hold this bushing in position.

A hopper 6 is mounted at the lower end of the housing 3 and normally receives the main grain feed pipe 7 which extends into the hold of the ship from the grain elevator. The hopper 6 is provided with an inclined bottom 8 extending thereacross and also has a main bottom 9 from which the hopper tube 10 extends upwardly through the hopper. The hopper 6 is provided with an opening 11 in one side thereof, as shown in Figs. 3 and 4, through which the grain passes and is directed by means of the inclined bottom 8. A distributing top 12 is mounted about the periphery of the hopper 6 and is provided with an open side for directing the grain outwardly.

A bottom distributing disk 13 is fixed upon the drive shaft 2 to rotate therewith and is held in position by means of a suitable locknut 14. A similar upper disk 15 is mounted for rotation about the periphery of the hopper 6 beneath the distributing top 12 and these distributing disks 13 and 15 have a plurality of distributing blades 16 secured therebetween, as shown in Figs. 4, 5, and 6.

These blades 16 are dished out, as shown in Fig. 6, or made substantially concave convex for the purpose of receiving the grain from the opening 11 and throwing it outwardly by means of centrifugal force as they are rotated from the drive shaft 2.

The hopper tube 10 has a gear 17 fixed on the upper end thereof, which meshes with the pinion 18 connected by means of a universal joint 19 with an operating handle 20. As the handle 20 is turned, the hopper is adjusted to direct the grain into different parts of the ship.

As an additional grain directing means, the hopper 6 is mounted on supports 21 which have their opposite ends secured to guides 22, as shown in Figs. 1 and 2, so that as the handle 20 is turned to adjust the position of the hopper, these guides direct the grain outwardly into any desired position, so as to distribute the grain into any part of the ship for keeping it level therein.

In operation, the machine is suspended in the hold of the ship and the grain feed pipe 7 positioned in the hopper 6, after which the motor 1 may be started to rotate the distributing disks and blades so that, as the grain passes through the pipe 7 into the hopper 6, it is directed by the inclined bottom 8 through the opening 11 between the disks 13 and 15, where it is received by the blades 16 and thrown outwardly by centrifugal force by these blades through the peripheral opening in the distributing top 12. The guides 22 serve to direct the grain into various parts of the ship and the position of these guides may be adjusted by turning the handle 20 for rotating the hopper 6 into its adjusted position.

In this manner, the grain may be distributed over the entire hold of the ship and kept level therein without requiring the stationing of men in the hold of the ship to shovel the grain thereover and keep it level. Thus, mechanical means is provided for this purpose which has heretofore been done only by manual power.

I claim:—

1. A centrifugal grain distributor for ships including a hopper for receiving the grain from a grain-elevator, an inclined bottom in said hopper, said hopper having an opening in the side thereof adjacent the inclined bottom for discharging the grain therefrom, discharging blades positioned about the periphery of the hopper and opening for receiving the grain from the inclined bottom through said opening, means for rotating the distributing blades to discharge the grain outwardly by centrifugal force, and means for adjusting the position of the hopper.

2. A grain distributor for ships including a hopper having an inclined bottom, a drive shaft, a housing for said drive shaft extending through the hopper, a bushing interposed beween the drive shaft and housing and fixed therein, distributing disks connected with the drive shaft to be rotated thereby and spaced apart from each other, and a plurality of radially arranged concave convex blades fixed between the disks in position to receive the grain from the inclined bottom and direct it outwardly by centrifugal force.

3. A centrifugal grain distributor for ships including a hopper having a bottom therein, centrifugal discharge blades connected with said hopper for receiving the grain therefrom and directing it outwardly, a hopper tube extending upwardly from the hopper, means connected with the upper end of said tube for revolving the hopper to an adjusted position, and guides mounted on opposite sides of said hopper for directing the grain therefrom over the bottom of the ship.

4. A distributor of the character described including a central hopper having a discharge opening therein, and rotary distributing blades arranged exteriorly of said hopper and around the opening and in position to receive material through said opening.

5. A distributor of the character described including a central hopper having a closed end and provided with a discharge opening adjacent said closed end, and rotary distributing blades journaled about said hopper in position to receive material through said opening and discharge the same in all directions about the hopper.

6. A distributor of the character described including a central hopper having a closed end and provided with a discharge opening adjacent said closed end, a bottom inclined in the direction of the openings, rotary distributing blades journaled about the hopper in position to receive material through the opening and discharge said material in all general directions therefrom, and a drive shaft projecting through the end of the hopper and connected with the blades to drive the same.

7. A distributor of the character described including a hopper, distributing blades in position to receive material from the hopper and discharge said material in all general directions from the hopper, and guides arranged approximately on opposite sides of the blades and extending in the same general direction for directing the discharge of the material.

In testimony whereof I affix my signature.

JUDSON C. HOWLAND.